US005555151A

United States Patent [19]

Baker et al.

[11] Patent Number: 5,555,151
[45] Date of Patent: Sep. 10, 1996

[54] NO-BRAKE POWER TRANSFER PHASE BALANCE SYCHRONIZATION SENSE CIRCUIT AND METHOD

[75] Inventors: Roy S. Baker; David W. Lefavour, both of Rockford, Ill.

[73] Assignee: Sundstrand Corporation, Rockford, Ill.

[21] Appl. No.: 377,899

[22] Filed: Jan. 25, 1995

[51] Int. Cl.⁶ ...................................................... H02H 3/18
[52] U.S. Cl. ............................. 361/79; 361/78; 307/51; 307/64; 307/87
[58] Field of Search ...................... 307/85–87, 71, 307/64, 51; 361/76, 78–79, 85–87

[56] References Cited

U.S. PATENT DOCUMENTS

3,493,778  2/1970  Cutler et al. ................................ 307/87

Primary Examiner—Jeffrey A. Gaffin
Assistant Examiner—Michael J. Sherry
Attorney, Agent, or Firm—Jeffery J. Makeever

[57] ABSTRACT

A poly-phase no-break power transfer phase balance synchronization sense circuit for an electric power generation and distribution system having a present source of electric power supplying poly-phase AC electric power through a first contactor to utilization equipment and a target source of electric power connectable to supply poly-phase AC electric power to the utilization equipment through a second contactor, a transfer of the source of AC electric power from the present source to the target source being accomplished by closing the second contactor prior to opening the first contactor upon synchronization of the two sources, comprises a circuit for rectifying the poly-phase AC electric power generated by the present source, the circuit generating a first rectified output signal, a circuit for rectifying the poly-phase AC electric power generated by the target source, the circuit generating a second rectified output signal, and a circuit for differentially summing the first rectified output signal and the second rectified output signal. This summing circuit generates a synchronization error signal in response to any phase of the poly-phase AC electric power generated by the present source differing in magnitude, phase relationship, or frequency from an associated phase of the poly-phase AC electric power generated by the target source. This synchronization error signal varies in magnitude in response to the magnitude of the difference. The circuit further comprises a circuit for generating a power transfer inhibit signal when the variable magnitude of the synchronization error signal exceeds a predetermined threshold.

12 Claims, 8 Drawing Sheets

NO-BRAKE POWER TRANSFER PHASE BALANCE SYCHRONIZATION SENSE CIRCUIT AND METHOD

FIELD OF THE INVENTION

The instant invention relates generally to no-break power transfers between sources of electric power, and more particularly to a circuit for sensing the phase balance and synchronization between two electric power sources prior to allowing a no-break power transfer to proceed.

BACKGROUND ART

Figure 1:
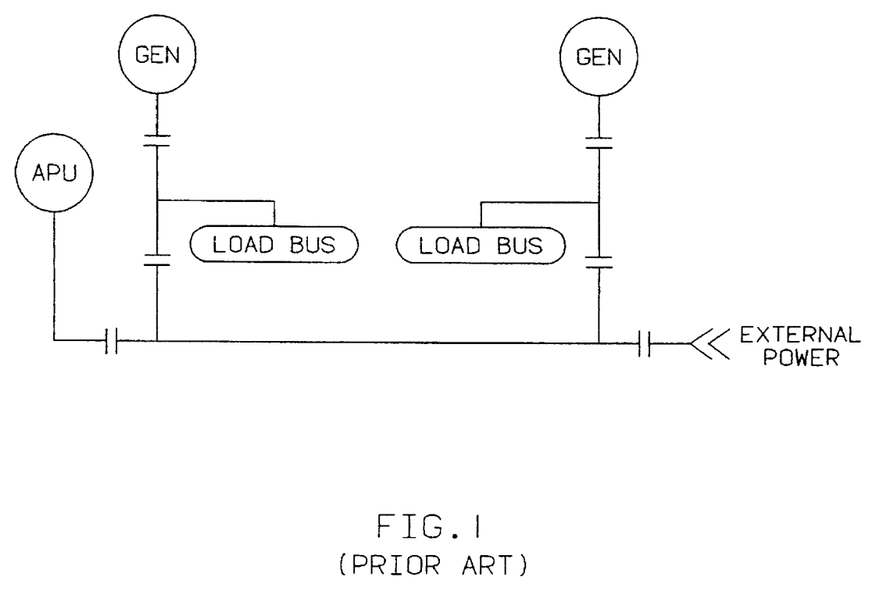
FIG. 1 is a single line diagram illustrating a typical electric power generating and distribution system for use on aircraft.

Electric power generation and distribution systems, especially those employed for use on aircraft, are required to provide certain redundancies to ensure that the loss of a single source of electric power does not result in a total loss of electric power to the utilization equipment. One method of providing this capability is to utilize at least two sources of electric power driven by separate prime movers, and a distribution system which allows any source of electric power to be coupled to any load, such as is illustrated in FIG. 1. By utilizing such a system, any source fault or change in availability of a source of electric power will result only in the transfer of loads to another source of electric power. Additionally, a power source priority scheme is included which ensures that as higher priority power sources become available, the utilization equipment loads will be transferred thereto and powered therefrom. As an example of the power source priority scheme, if the utilization equipment is first powered by the external power, they will be transferred to the APU generator when the APU becomes available, and then again to the main engine generators when the main engines are started.

Figure 2:
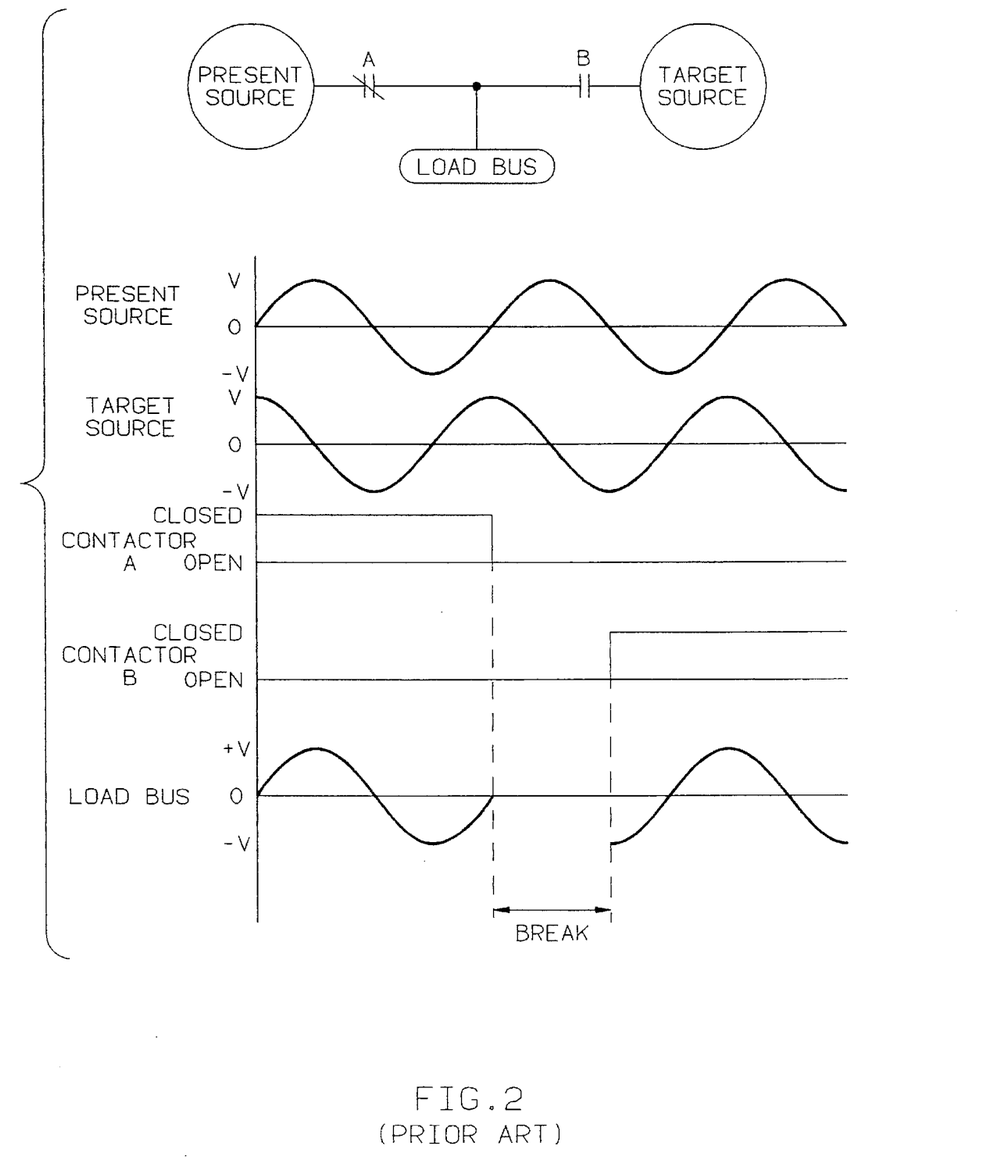
FIG. 2 is a combined single line and waveform diagram illustrating a single phase break power transfer to a utilization equipment bus.

Typically, a short break in power delivered to the loads results from the transfer from one source to another as illustrated by FIG. 2. This break is a result of opening the present source's contactor prior to closing the target source's contactor to complete the transfer. This method of break power transfer greatly simplifies the control needed to transfer loads to different sources because the two sources are never electrically coupled one to the other. Each transfer simply entails turning off the present source, then turning on the target source.

A problem is realized with this simplistic approach of power transfer, however, as more and more electronic and computer equipment is utilized. As discussed above, each break power transfer results in a total loss of electric power to the utilization equipment for a short duration. Although the control of the transfer attempts to keep this break to a minimum, the duration of power loss is controlled largely by the mechanical actuation time of the contactors themselves. As a result, the break in power during a power source transfer may be of sufficient duration to cause the electronic and computer equipment to reset. While this may not be a significant problem on ground based distribution systems, on airborne systems a computer memory reset, which may take from two to 10 seconds, while in flight could result in significant problems for the flight crew.

Figure 3:
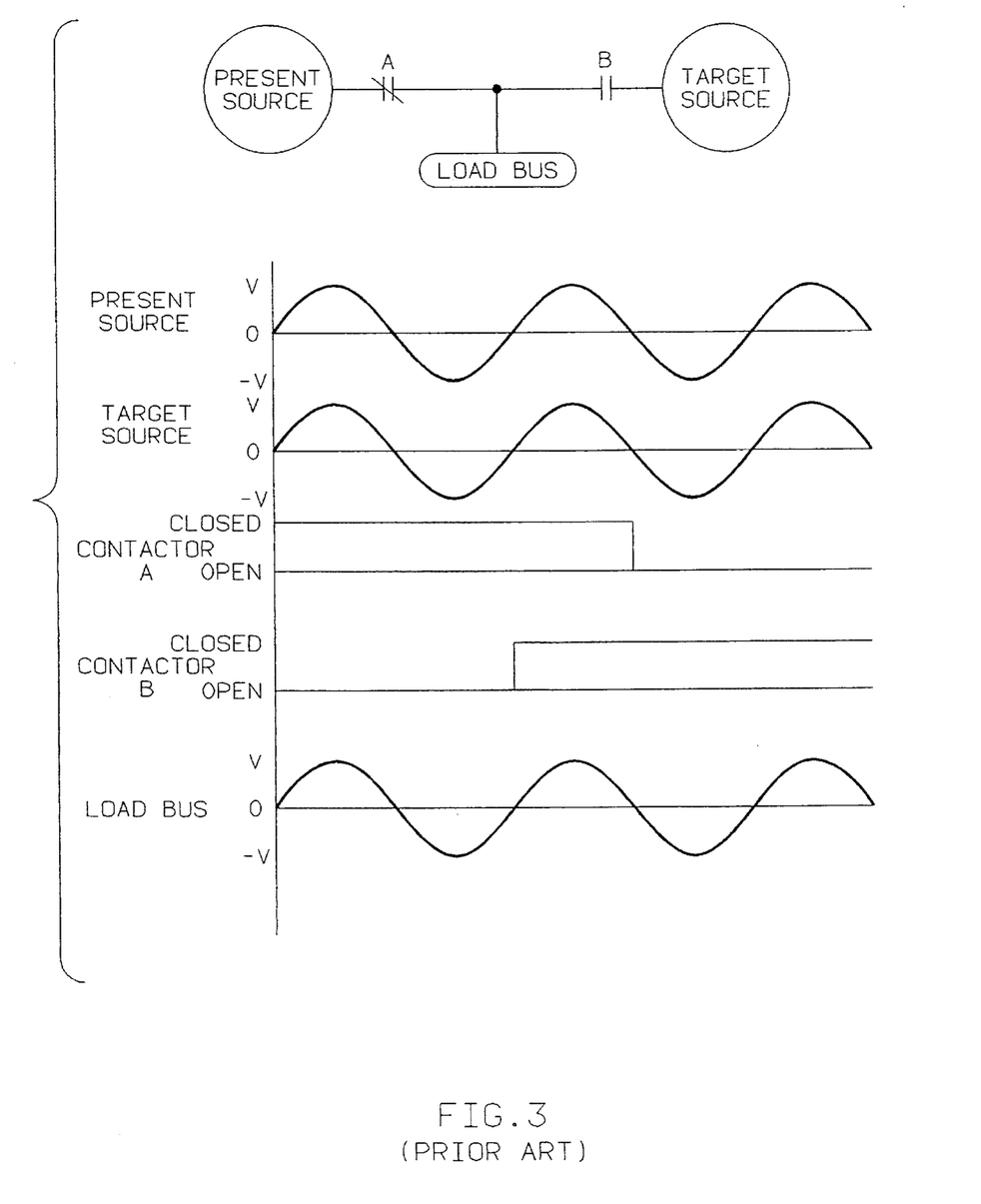
FIG. 3 is a combined single line and waveform diagram illustrating a single phase no-break power transfer to a utilization equipment bus.

To resolve any potential problems which may have resulted from the use of a simplistic break power transfer system, modern electric power generation and distribution systems utilize no-break power transfer systems. For a no-break power transfer, as illustrated in FIG. 3, the target power source's contactor is closed prior to opening the present power source's contactor so that the utilization equipment never is exposed to a break in electric power. During this power transfer, the two sources of electric power are electrically coupled together for a short duration such that any difference in voltage, frequency, or phase will result in power circulating between them. To minimize this circulating power, the duration that the two sources are electrically coupled together and the difference in voltage, frequency, and phase are all controlled to a minimum prior to initiating the transfer by closing the target source's contactor.

Even small differences in these parameters, however, will result in large currents circulating between the sources during the transfer due to the low impedance of the feeders coupling the sources together. As an example, a phase error of only 3° between the source voltages will result in approximately 260 Amperes of circulating current calculated as follows:

$$\text{Voltage difference} = 115 \angle 0° - 115 \angle 3° = 6.02 \angle -88.5° \quad (1)$$

$$\text{Feeder Impedance} = 0.0228 + j0.0044 = 0.02322 \angle 10.9° \quad (2)$$

$$\text{Circulating Current} = \frac{\text{Voltage Difference}}{\text{Feeder Impedance}} = \quad (3)$$

$$\frac{6.02 \angle -88.5°}{0.02322 \angle 10.92°} = 259.29 \angle -99.4° \text{ Amps}$$

Figure 4:
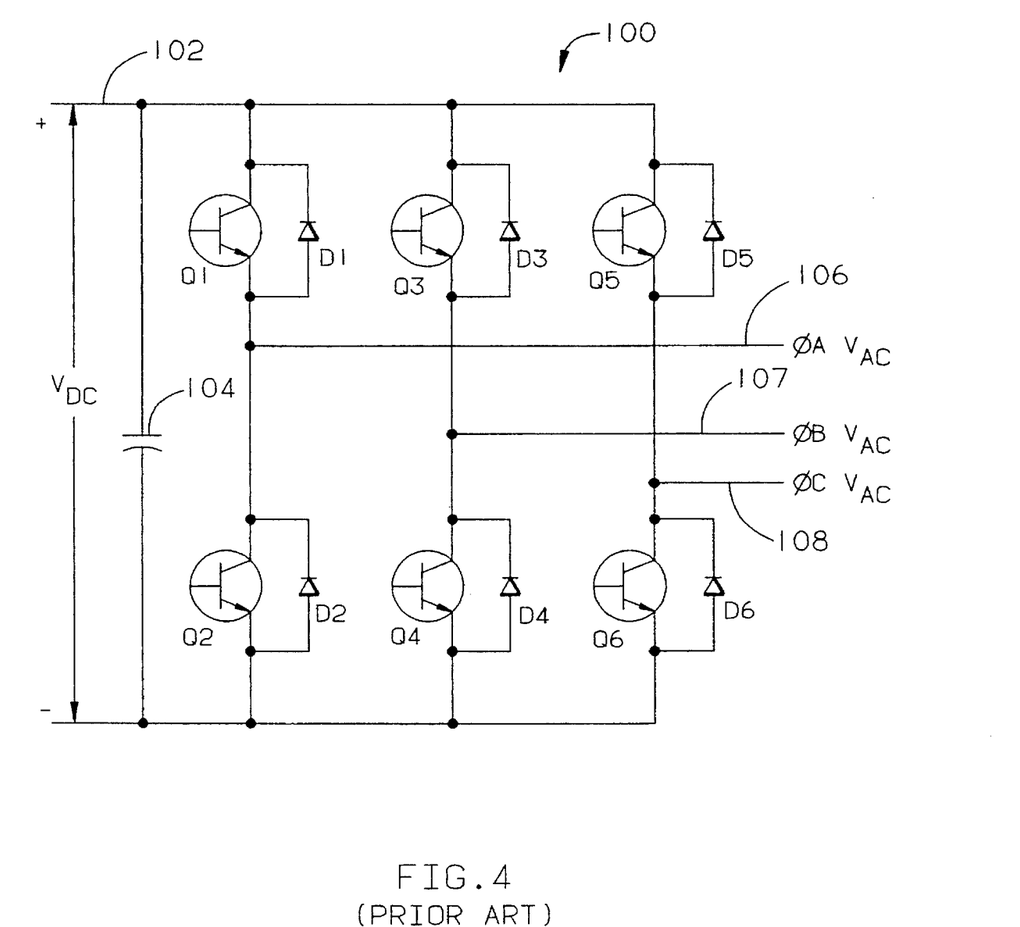
FIG. 4 is a simplified schematic diagram of a typical DC link topology electric power converter.

While this amount of circulating current may be handled by larger conventional rotating generators, many electric power generating systems utilize static sources of electric power which cannot easily dissipate this much power. A common topology of the static power converter 100 utilizes a DC link 102 and a DC link capacitor 104 as illustrated by FIG. 4. A series of power semiconductor switches Q1–Q6 then convert this dc link power into a poly-phase controlled frequency ac output on feeders 106–108 for use by the utilization equipment. These switches, as with all semiconductor components, can be damaged by exposing them to excessive voltage. During the no-break power transfer event with a 3° phase difference between its output voltage and the other source's output voltage, the circulating current will flow from the feeders 106–108, through the flyback diodes D1–D6 and to the dc link capacitor 104. This current flow will result in a net energy transfer from the distribution system to the dc link, resulting in an increase in the dc link voltage. This dc link voltage increase, in turn, may well be enough to result in severe damage to the power semiconductor switches Q1–Q6 of the static source 100.

To preclude the occurrence of this problem, conventional no-break power transfer sensing controls monitor a single phase of the old power source and the same phase of the new power source. When the phase error between these two phases is less than a set threshold, the control allows the transfer to take place. This method of enabling no-break power transfers, while acceptable when transferring between two rotating sources, may still result in damage to a static source such as the converter described above. The problem is that due to unbalances in the loading of the phases of the generator, the three phase output power cannot be assumed to be perfectly 120° displaced one from another. Additionally, machine winding tolerances may also account for a small deviation in the phase displacement of the rotating machine. The output of the electronic converter, however, is controlled to generate three phases which are perfectly displaced by 120° one from the other. If only one phase of the rotating generator were sensed and if the three phases of that machine were not perfectly 120° displaced, a no-break power transfer would be allowed when the associated phase of the converter becomes synchronized with it. If the 120° symmetry varied, as demonstrated above, by even a difference of only 3°, large potentially damaging circulating currents will result.

The instant invention is directed at overcoming this problem and allowing only those no-break power transfers which will not result in damage to a static source.

SUMMARY OF THE INVENTION

It is the principle objective of the instant invention to provide a new and improved no-break power transfer sense circuit. More particularly, it is the principle objective of the instant invention to provide a no-break power transfer sense circuit which indicates when any phase of a target source of electric power differs from the associated phase of the present source in magnitude, phase relationship, or frequency by a predetermined amount to preclude damage to either the present source or the target source of electric power and to minimize power disturbance to the utilization equipment.

In a preferred embodiment of the instant invention, a poly-phase no-break power transfer phase balance synchronization sense circuit for an electric power generation and distribution system having a present source of electric power supplying poly-phase AC electric power through a first contactor to utilization equipment and a target source of electric power connectable to supply poly-phase AC electric power to the utilization equipment through a second contactor, a transfer of the source of AC electric power from the present source to the target source being accomplished by closing the second contactor prior to opening the first contactor upon synchronization of the two sources, comprises a circuit for rectifying the poly-phase AC electric power generated by the present source, the circuit generating a first rectified output signal, a circuit for rectifying the poly-phase AC electric power generated by the target source, the circuit generating a second rectified output signal, and a circuit for differentially summing the first rectified output signal and the second rectified output signal. This summing circuit generates a synchronization error signal in response to any phase of the poly-phase AC electric power generated by the present source differing in magnitude, phase relationship, or frequency from an associated phase of the poly-phase AC electric power generated by the target source. This synchronization error signal varies in magnitude in response to the magnitude of the difference.

In a highly preferred embodiment of the instant invention, the circuit further comprises a circuit for generating a power transfer inhibit signal when the variable magnitude of the synchronization error signal exceeds a predetermined threshold. This predetermined threshold is set to ensure no damage is sustained by either the present source or the target source during the no-break power transfer of the source of AC electric power from the present source to the target source.

A preferred method of sensing synchronization in accordance with the instant invention comprises the steps of rectifying the poly-phase AC electric power generated by the present source of electric power to generate a first rectified output signal, rectifying the poly-phase AC electric power generated by the target source of electric power to generate a second rectified output signal, and differentially summing this first rectified output signal and the second rectified output signal to generate a synchronization error signal in response to any phase of the poly-phase AC electric power generated by the present source differing in magnitude, phase relationship, or frequency from art associated phase of the poly-phase AC electric power generated by the target source, the synchronization error signal varying in magnitude in response to the magnitude of the difference. This preferred method further comprises the steps of comparing this synchronization error signal to a predetermined threshold, and generating a control signal to indicate that the present source and the target source are in synchronism when the synchronization error signal is less than the predetermined threshold.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 5:
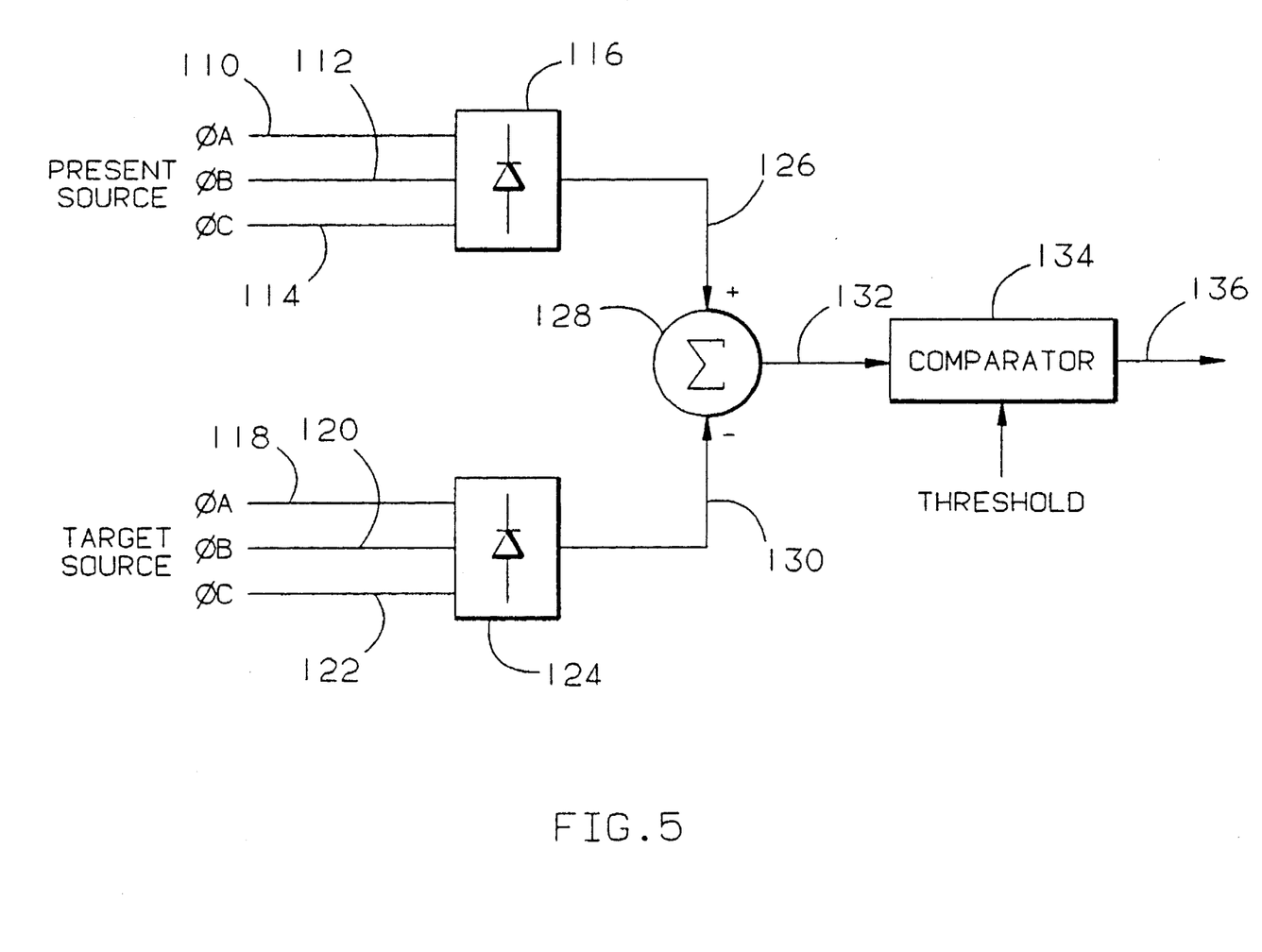
FIG. 5 is a block diagram of a preferred embodiment of the instant invention.

In a preferred embodiment of the instant invention, as illustrated in FIG. 5, all phases of the source supplying electric power to the utilization equipment (hereinafter "present source") 110, 112, and 114 are sensed and input to a means 116 for rectifying the sensed waveforms. Additionally, all phases of the source to which the utilization equipment will be transferred (hereinafter "target source") 118, 120, and 122 are sensed and input to a means 124 for rectifying the sensed waveforms. The output of rectifying means 116 is input via line 126 to summing means 128, and the output of rectifying means 124 is input via line 130 to summing means 128. These two waveforms are differentially summed to produce an output synchronization error signal on line 132, which is input to a means 134 for comparing this signal with a predetermined threshold. This comparison means 134 generates a power transfer inhibit signal on line 136 when the synchronization error signal exceeds the threshold. Alternatively, the comparator means 134 generates a control signal to indicate that the present source and the target source are in synchronism when the output synchronization error signal is less than the threshold.

Figure 6:
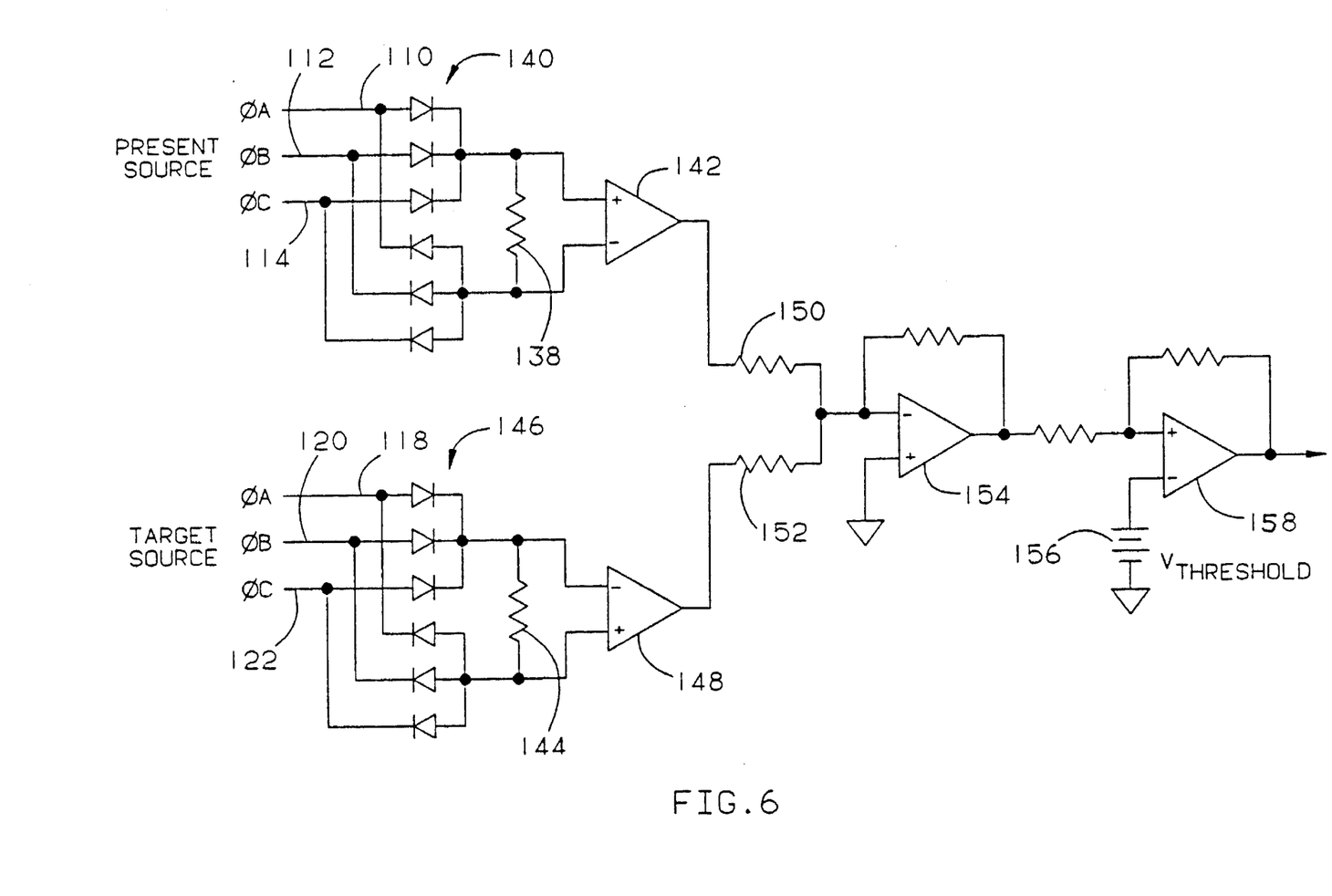
FIG. 6 is a schematic diagram of an exemplary analog implementation of a preferred embodiment of the instant invention.

In an exemplary analog implementation of the preferred embodiment of the instant invention, as illustrated in FIG. 6, all of the phases of the present source 110, 112, and 114 are rectified across resistor 138 by diode bridge 140. This unfiltered rectified signal is input to a non-inverting differential amplifier 142. Likewise, all of the phases of the target source 118, 120 and 122 are rectified across resistor 144 by diode bridge 146 and input to an inverting differential amplifier 148. The output from these two differential amplifiers are polarity reversed one from the other, and are summed through resistors 150 and 152 and amplifier 154. The signal output from the voltage follower amplifier 154 is compared to a predetermined threshold voltage $V_{threshold}$ 156 by comparator 158. The output of this comparator 158 will be generated when the input from amplifier 154 exceeds the threshold 156, indicating that not all of the phases of the two sources are in synchronism. The threshold is set to a value which corresponds to the maximum acceptable difference in phase displacement, frequency, and magnitude between the two sources. This ensures that no damage is sustained by either the present source or the target source during the no-break power transfer of the source of AC electric power from the present source to the target source. This value will differ depending on the rating of the static source and of the power semiconductor devices used therein. For a static source with a power rating of 20 kVA, the threshold is preferably set to a value corresponding to a phase difference between associated phases of the present source and the target source of less than three electrical degrees.

Figure 7:
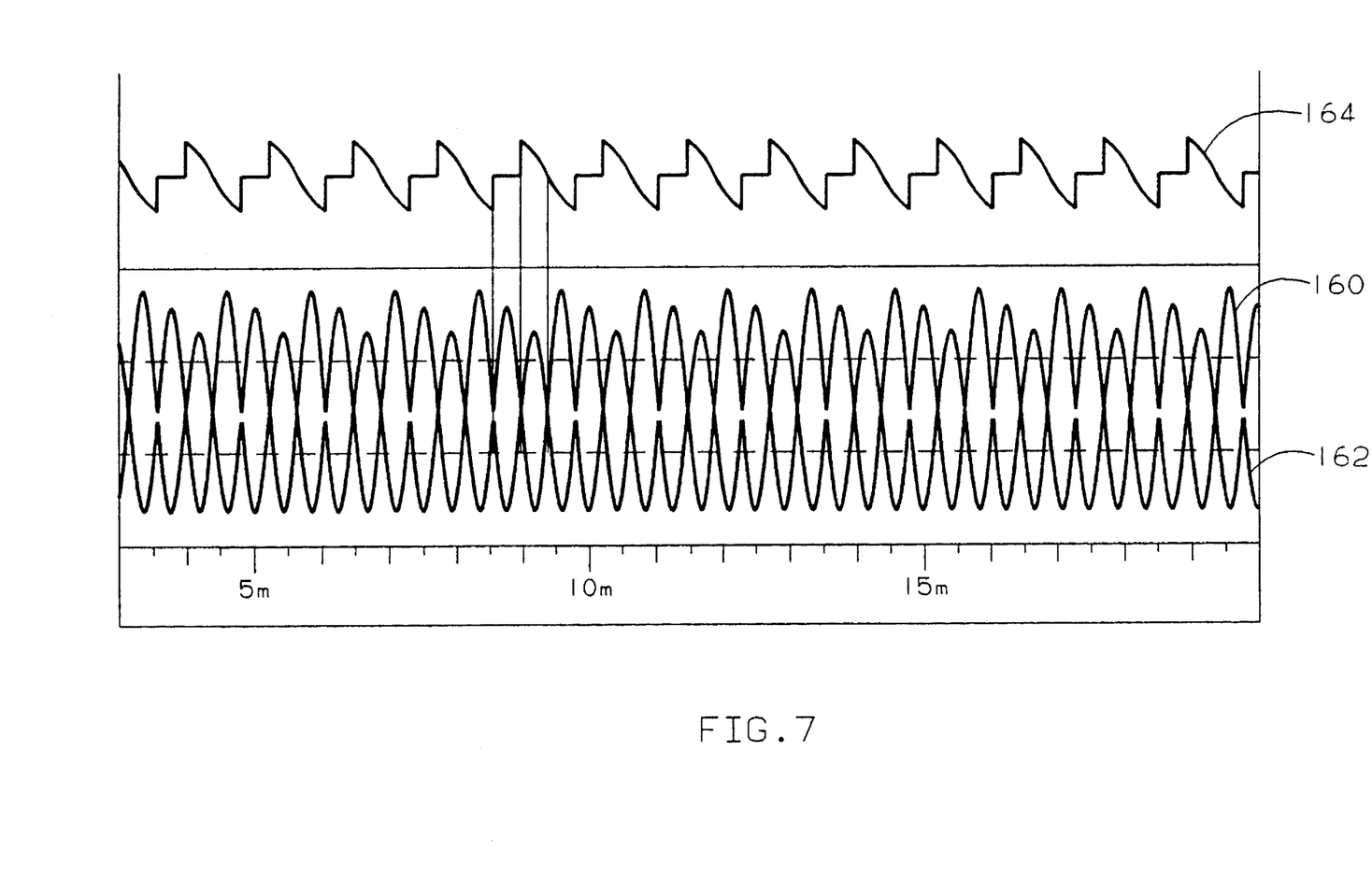
FIG. 7 is a waveform diagram illustrating operation of the preferred embodiment of the instant invention with a 5° asymmetry phase balance of the present source.
Figure 8:
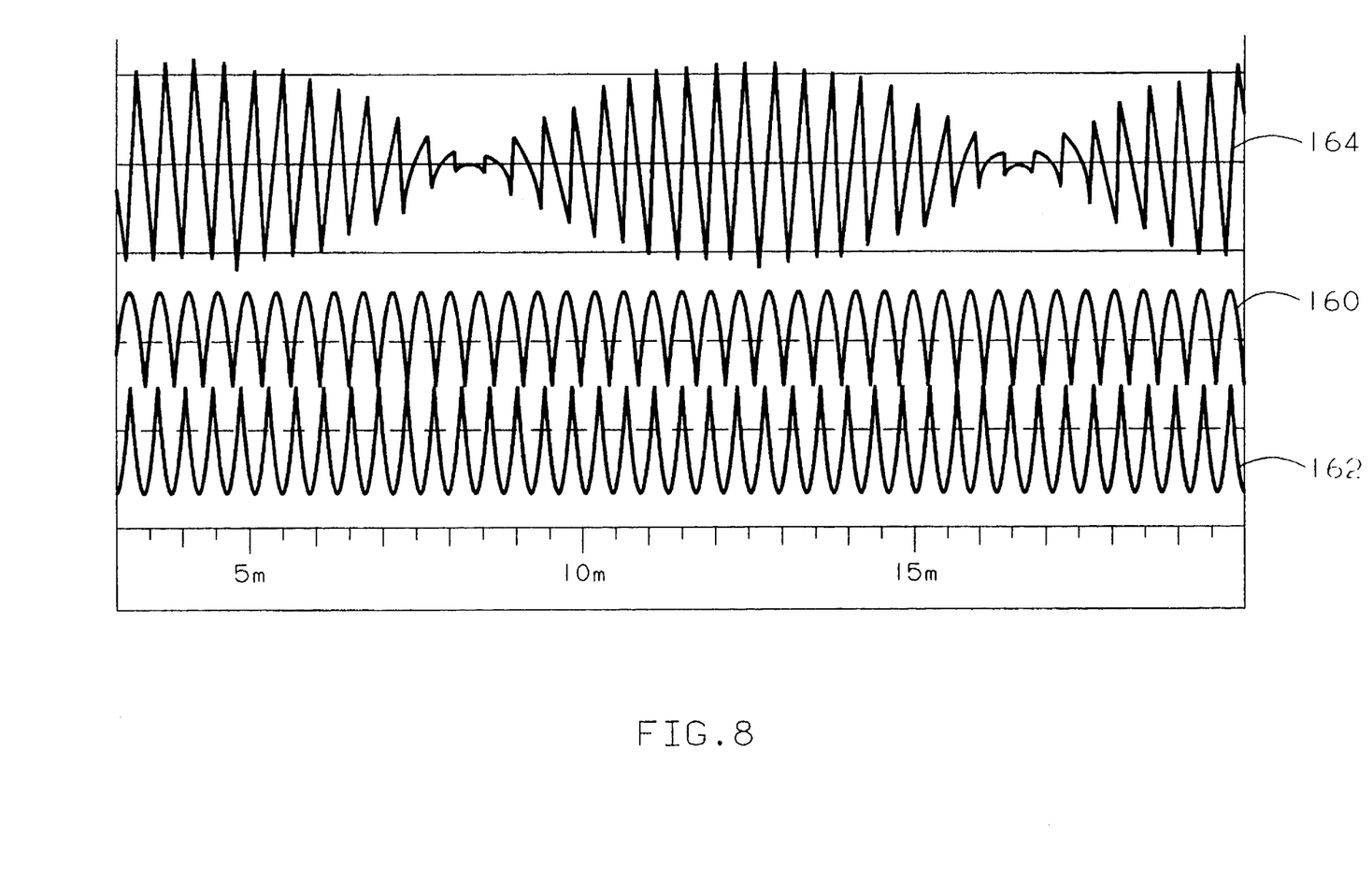
FIG. 8 is a waveform diagram illustrating operation of the preferred embodiment of the instant invention with a 20 Hz difference between the present source and the target source.

FIG. 7 illustrates the operation of the preferred embodiment of the instant invention when the present source has a 5° phase displacement error in its output waveform, i.e. the first phase is displaced by 115° from the second phase, and by 125° from the third phase instead of the normal 120° displacement between all phases. Waveform 160 is output from differential amplifier 142 and shows the asymmetry in the rectified waveform caused by the 5° phase displacement error. Note that with this waveform, as with waveform 162, the ripple is not filtered to produce a smooth DC signal. The ripple is important to allow sensitivity to small variations in phase displacement. Waveform 162 is output from inverting differential amplifier 148 and is summed with waveform 160 as described above. Waveform 164 is the resultant of these two rectified waveforms; and indicates that not all phases are synchronized. This waveform, being generated as a result of a greater than 30 phase difference, will result in an output being generated by comparator 158 of FIG. 6 which will be used by the system power transfer logic (not shown) to inhibit the no-break power transfer to preclude damage to the static source. Likewise, FIG. 8 illustrates the operation of the preferred embodiment of the instant invention with a frequency difference between the present and target sources of 10 Hz. As may be observed from both of these figures, the synchronization error signal 164 varies in magnitude in response to the amount of difference between the present and target sources' magnitude, phase relationship, and frequency. As this variable magnitude increases beyond the threshold level, comparator 158 will generate a power transfer inhibit signal to allow the power transfer control to lockout the transfer and prevent any damage from occurring. As the two sources' outputs become synchronized, the synchronization error signal decreases below the threshold level, and the power transfer inhibit signal is removed (or a signal which indicates that the sources are in synchronism is generated depending on the polarity of the controller's power transfer logic).

A preferred method of sensing synchronism between each phase of a present source of poly-phase AC electric power and a target source of poly-phase AC electric power, comprises the steps of (a) rectifying the poly-phase AC electric power generated by the present source of electric power to generate a first rectified output signal, (b) rectifying the poly-phase AC electric power generated by the target source of electric power to generate a second rectified output signal, and (c) differentially summing the first rectified output signal and the second rectified output signal to generate a synchronization error signal in response to any phase of the poly-phase AC electric power generated by the present source differing in magnitude, phase relationship, or frequency from an associated phase of the poly-phase AC electric power generated by the target source. Additionally, a highly preferred method comprises the additional steps of (d) comparing the synchronization error signal to a predetermined threshold, and (e) generating a control signal to indicate that the present source and the target source are in synchronism when the synchronization error signal is less than said predetermined threshold. Alternatively, step (e) comprises generating a power transfer inhibit signal when the synchronization error signal exceeds the predetermined threshold.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the, invention, and the exclusive use of all modifications which come within the scope of the appended claims is reserved.

We claim:

1. A three phase no-break power transfer phase balance synchronization sense circuit for an electric power generation and distribution system having a present source of electric power supplying three phase AC electric power through a first contactor to utilization equipment and a target source of electric power connectable to supply three phase AC electric power to the utilization equipment through a second contactor, a transfer of the source of AC electric power from the present source to the target source being accomplished by closing the second contactor prior to opening the first contactor upon synchronization of each phase the two sources, comprising:

first means in sensory communication with the present source of electric power for rectifying the three phase AC electric power generated thereby, said rectifying means generating a first rectified output signal;

second means in sensory communication with the target source of electric power for rectifying the three phase AC electric power generated thereby, said rectifying means generating a second rectified output signal;

summing means operatively coupled to said first means and said second means for differentially summing said first rectified output signal and said second rectified output signal, said summing means generating a synchronization error signal in response to any phase of the three phase AC electric power generated by the present source differing in magnitude, phase relationship, and frequency from an associated phase of the three phase AC electric power generated by the target source, said synchronization error signal varying in magnitude in response to the amount of said difference in magnitude, phase relationship, and frequency.

2. The circuit of claim 1, wherein said first rectified output signal and said second rectified output signal are unfiltered.

3. The circuit of claim 1, further comprising means coupled to said summing means for generating a power transfer inhibit signal when said variable magnitude of said synchronization error signal exceeds a predetermined threshold.

4. The circuit of claim 3, wherein said predetermined threshold is set to ensure no damage is sustained by either the present source or the target source during the transfer of the source of AC electric power from the present source to the target source.

5. The circuit of claim 3, wherein said predetermined threshold is set to a value corresponding to a phase difference between associated phases of the present source and the target source of three electrical degrees.

6. A method of sensing synchronism between each phase of a present source of poly-phase AC electric power and a target source of poly-phase AC electric power, comprising the steps of:

rectifying the poly-phase AC electric power generated by the present source of electric power to generate a first rectified output signal;

rectifying the poly-phase AC electric power generated by the target source of electric power to generate a second rectified output signal; and differentially summing said first rectified output signal and said second rectified output signal to generate a synchronization error signal in response to any phase of the poly-phase AC electric power generated by the present source differing in magnitude, phase relationship, and frequency from an associated phase of the poly-phase AC electric power generated by the target source, said synchronization error signal varying in magnitude in response to the magnitude of said difference in magnitude, phase relationship, and frequency.

7. The method of claim 6, further comprising the steps of:

comparing said synchronization error signal to a predetermined threshold; and generating a control signal to indicate that the present source and the target source are in synchronism when said synchronization error signal is less than said predetermined threshold.

8. A poly-phase no-break power transfer phase balance synchronization sense circuit for an electric power generation and distribution system having a present source of electric power supplying poly-phase AC electric power through a first contactor to utilization equipment and a target source of electric power connectable to supply poly-phase AC electric power to the utilization equipment through a second contactor, a transfer of the source of AC electric power from the present source to the target source being accomplished by closing the second contactor prior to opening the first contactor upon synchronization of the two sources, comprising:

first means in sensory communication with each phase of the present source of electric power for rectifying the poly-phase AC electric power generated thereby, said rectifying means generating a first rectified output signal;

second means in sensory communication with each phase of the target source of electric power for rectifying the poly-phase AC electric power generated thereby, said rectifying means generating a second rectified output signal;

summing means operatively coupled to said first means and said second means for differentially summing said first rectified output signal and said second rectified output signal, said summing means generating a synchronization error signal in response to any phase of the poly-phase AC electric power generated by the present source differing in magnitude, phase relationship, and frequency from an associated phase of the poly-phase AC electric power generated by the target source, said synchronization error signal varying in magnitude in response to the amount of said difference in magnitude, phase relationship, and frequency.

9. The circuit of claim 8, wherein said first rectified output signal and said second rectified output signal are unfiltered.

10. The circuit of claim 8, further comprising means coupled to said summing means for generating a power transfer inhibit signal when said variable magnitude of said synchronization error signal exceeds a predetermined threshold.

11. The circuit of claim 10, wherein said predetermined threshold is set to ensure no damage is sustained by either the present source or the target source during the transfer of the source of AC electric power from the present source to the target source.

12. The circuit of claim 10, wherein said predetermined threshold is set to a value corresponding to a phase difference between associated phases of the present source and the target source of three electrical degrees.

* * * * *